United States Patent Office 3,203,812
Patented Aug. 31, 1965

1

2

3,203,812

ORGANIC ZIRCONIUM COMPOUNDS

Harold Garton Emblem and Albert Keith Harrison, Grappenhall, England, assignors to Unilever Limited, Port Sunlight, England, a corporation of Great Britain No Drawing. Filed Aug. 29, 1962, Ser. No. 220,148
Claims priority, application Great Britain, Aug. 31, 1961, 31,437/61
15 Claims. (Cl. 106—38.35)

This invention relates to organic zirconium compounds.

The invention provides organic zirconium esters of the general formula $Zr(ORX)_4$ where R is an alkylene group having 2 to 4 carbon atoms and X is a chlorine, bromine or iodine atom. X is preferably a chlorine atom.

The esters may be prepared by reacting zirconium tetrachloride, tetrabromide or tetraiodide and an epoxy alkane containing 2 to 4 carbon atoms. The reaction which takes place between zirconium tetrachloride and ethylene oxide, for example, may be represented by the following reaction scheme:

The reaction is conveniently carried out by dispersing the zirconium tetrachloride in dry carbon tetrachloride or other inert medium and passing in or adding the epoxy alkane which may be dissolved in an organic solvent. The reaction is usually exothermic and cooling of the reaction vessel may be necessary. The carbon tetrachloride or other inert medium may be removed by distillation. Examples of other inert reaction media are hydrocarbons, such as benzene or petroleum distillates, and chloroform.

It has been discovered that the zirconium esters of the invention can under certain conditions be hydrolysed to form a coherent gel capable of binding refractory powders. This property renders the esters suitable for use in the manufacture of refractory articles such as crucibles and moulds, for example ceramic shell moulds, for the casting of high melting point metals and alloys. Parts of moulds and cores, which are subsequently assembled to give a complete mould for casting metals or alloys, can also be produced. The zirconium esters of the invention are particularly suitable for the production of refractory crucibles for the melting of metals and alloys.

Gels having binding properties can be produced by the hydrolysis of liquid compositions comprising a zirconium ester of the invention and a suitable amount of an aliphatic hydroxyamine containing up to 12 carbon atoms. The preferred amines are those of the general formula $R^1.NH.R^2$ where $R^1$ is a hydroxyalkyl group containing 2 to 4 carbon atoms and $R^2$ is hydrogen or an alkyl or hydroxyalkyl group containing up to 4 carbon atoms. Examples of such preferred hydroxyamines are ethanolamine, isopropanolamine diethanolamine diisopropanolamine, 2-amino-2-methyl-propan-1-ol, 2-aminobutan-1-ol, N-butyl ethanolamine and N-ethyl ethanolamine. Another example of a hydroxyamine that may be used is 2-amino-2-ethyl-propan-1,3-diol.

If a monohydroxyamine, or a polyhydroxyamine in which each hydroxyl group is attached to the same carbon chain, is employed, then the amount of the hydroxyamine must be at least 1 mole per mole of the zirconium ester. However, if the hydroxyamine contains hydroxyl groups on different carbon chains then less amine may be used. Thus, for example, if $R^2$ in the above formula is a hydroxyalkyl group the amount of amine required to give a composition which will produce a gel having binding properties is at least 0.5 mole per mole of the zirconium ester.

A gel having binding properties can be produced from the above liquid compositions comprising an organic zirconium ester and aliphatic hydroxyamine by mixing them with a solution of suitable concentration of water in a mutual solvent for water, the ester and the hydroxyamine, and then allowing the mixture to set to a gel. Addition of water alone to a mixture of zirconium ester and hydroxyamine results in nearly all cases in the formation of a flocculent precipitate having no binding properties. Also, where a solvent is essential, the water must be in a sufficient degree of dilution or otherwise no coherent gel will be formed. The amount of solvent required in order that a coherent gel may be produced is dependent on the hydroxyamine employed. Simple trial will determine suitable concentrations of water for coherent gel formation in any particular instance. The liquid composition will form a coherent gel in a time dependent on the molar proportion of the amine relative to that of the zirconium ester and on the amount of water added. When a solvent is used the gel time will also be dependent on the concentration of the water in the solvent. Suitable mutual solvents for the water, ester and hydroxyamine are the lower aliphatic alcohols, for example methanol, ethanol, normal propanol and isopropanol. If desired, some solvent may be included in the mixture of zirconium ester and hydroxyamine.

In certain cases, if sufficient of the hydroxyamine is employed, the use of a solvent can be dispensed with. Thus, for example, when about 1.3 moles or more diethanolamine are employed per mole of zirconium ester, addition of water without any solvent can cause gel formation.

To make refractory articles, the above liquid compositions comprising an organic zirconium ester and an aliphatic hydroxyamine are mixed with a solution of suitable concentration of water in a mutual solvent for water, the amine and the ester, or in some cases are mixed with water only, so as to cause formation of a gel, refractory powder is added to the liquid mixture prior to gel formation, the resultant mixture is formed into the desired shape, gel formation is allowed to occur and the shape allowed to harden, whereafter the hardened shape is fired. Preferred refractories are zircon and alumina.

The following examples illustrate the invention:

EXAMPLE 1

466 grams of zirconium tetrachloride were dispersed in 4000 ml. of dry carbon tetrachloride, and ethylene oxide passed in until ionic chlorine disappeared. Vigorous agitation of the reaction mixture was necessary to prevent settling out of a thick paste which formed in the initial stage of the reaction. The reaction temperature was not allowed to exceed 50° C. to avoid the discolouration of the product. The temperature could be controlled by cooling the reaction vessel with water or ice-water and also by varying the flow-rate of the ethylene oxide. When the reaction was complete the reaction product was filtered using 10 g. of dry "Dicalite" as a filter aid, in order to remove the small amount of colloidal zirconia present in the commercial zirconium tetrachloride starting material. Carbon tetrachloride was then evaporated off under vacuum, the temperature again being kept below 50° C. to prevent discolouration of the product. About 3600 ml. of carbon tetrachloride were recovered. Some carbon tetrachloride was left in the product to render it pourable. The zirconia content of the final product was 27–28% (calculated for $$Zr(OC_2H_4Cl)_4{:}ZrO_2=30\%)$$

The zirconium tetra betachloroethoxide produced in accordance with the process described in this example was the material used in the procedures described in the Examples 4 to 7, 11 to 17 and Example 19.

EXAMPLE 2

The process described in Example 1 was repeated using 46.6 grams of zirconium tetrachloride suspended in 500 ml. of dry carbon tetrachloride. As before, the carbon tetrachloride was distilled off under vacuum from the filtered reaction product but in this case enough carbon tetrachloride was left to give a final material having a $ZrO_2$ content of 24–26%. This was the material used in the subsequent Examples 8, 9, 10 and 18.

EXAMPLE 3

117 grams of zirconium tetrachloride were dispersed in 500 ml. of dry carbon tetrachloride, and 116 grams of 1,2-propylene oxide added slowly. 30 grams more of propylene oxide were added afterwards with the reaction mixture warmed to 50° C., as the last stage of the reaction was slow. Heating was continued until ionic chlorine disappeared. At this stage, the carbon tetrachloride solvent was removed by distillation under vacuum, using steam bath heating. The $ZrO_2$ content of the product was 26.8% (calculated for $Zr(OC_3H_6C)_4$:$ZrO_2$=26.4%).

EXAMPLE 4

20.5 grams of the product of Example 1 (20.5 g.

$$Zr(OC_2H_4Cl)_4=1 \text{ mol})$$

and 5 grams of 2-amino-2-methyl-propan-1-ol (1.1 mols) and 2 ml. of isopropanol were mixed. To this mixture was added a solution of 3.5 grams of water in 4 ml. of isopropanol. The gel time of the mixture was 1 minute 50 seconds. 3.5 grams of water in 2 ml. isopropanol gave a flocculent precipitate on mixing.

EXAMPLE 5

20.5 grams of the product of Example 1 and 5 grams of 2-amino-butan-1-ol (1.1 mols) and 2 ml. of isopropanol were mixed. To this mixture was added, with stirring, a solution of 3.5 grams of water in 4 ml. of isopropanol. The gel time was 6 minutes.

EXAMPLE 6

20.5 grams of the product of Example 1 and 5.7 grams of diethanolamine (1.1 mols) and 2 ml. of isopropanol were mixed. To this mixture was added, with stirring, a solution of 3.5 grams of water in 4 ml. of isopropanol. The gel time was 4¾ minutes.

EXAMPLE 7

20.5 grams of the product of Example 1 and 5.7 grams of diethanolamine (1.1 mols) and 2 ml. of isopropanol were mixed. To this mixture was added, with stirring, a solution of 2.0 grams of water in 4 ml. of isopropanol. The gel time was about 40 minutes.

EXAMPLE 8

20.5 grams of the product of Example 2 and 5 grams of monoisopropanolamine (1.33 mols) and 1 ml. of isopropanol were mixed. To the mixture was added a solution of 3.6 grams of water in 2 ml. of isopropanol. The gel time was 20 minutes.

EXAMPLE 9

20.5 grams of the product of Example 2 and 5 grams of monoisopropanolamine and 3 ml. of isopropanol were mixed. To the mixture was added a solution of 3.6 grams of water in 2 ml. of isopropanol. The gel time was 10 minutes.

EXAMPLE 10

20.5 grams of the product of Example 2 and 3 grams of monoethanolamine (1 mol) and 1 ml. of isopropanol were mixed. To the mixture was added a solution of 3.6 grams of water in 2 ml. of isopropanol. The gel time was about 30 seconds.

EXAMPLES 11 TO 15

Various mixtures of the product of Example 1 and diethanolamine were prepared and to these were added as gelling agent solutions of water in isopropanol, which solutions were prepared by mixing isopropanol with a 20% (w./w.) soltuion of water in isopropanol. The weight of the zirconium ester and diethanolamine mixture was in each case 25 grams. The time for gelation of the mixtures was observed. The results are summarised in the able which gives the zirconium ester:diethanolamine ratio, the composition of the gelling agent and the gelation time of the mixture.

*Table*

| Example | Zirconium Ester:Diethanolamine Molar Ratio | Gelling Agent | | Gel Time in Minutes |
|---|---|---|---|---|
| | | Isopropanol, ml. | 20% (w./w.) water solution in Isopropanol, ml. | |
| 11 | 1:0.97 | 6.25 | 3.75 | 38 |
| 12 | 1:0.97 | 5.0 | 5.0 | 8 |
| 13 | 1:0.88 | 6.25 | 3.75 | 19 |
| 14 | 1:0.88 | 5.0 | 5.0 | 3½ |
| 15 | 1:0.77 | 5.0 | 5.0 | 5 |

EXAMPLE 16

150 grams of the product of Example 1 and 50 grams of diethanolamine (1.3 mols) were mixed. 1 ml. of water was added to the mixture with rapid stirring. The gel time of the resulting mixture was 8 minutes.

EXAMPLE 17

20.5 grams of the product of Example 1 and 5 grams of 2-amino-butan-1-ol (1.1 mols) and 2 ml. of isopropanol were mixed. To this mixture was added, with stirring, a solution of 3.5 grams of water in 4 ml. of isopropanol. All of the above mixture was added, prior to gel formation, to 170 grams of zircon powder and the resulting slurry used to cast a crucible. The crucible was stripped from the mould 12 minutes after casting during which time the slurry had set, and the crucible was allowed to harden by being left to dry in air overnight. The crucible was then fired to 1000° C. to mature the zirconia bond.

EXAMPLE 18

20.5 grams of the product of Example 2 and 5 grams of monoisopropanolamine and 2 ml. of isopropanol were mixed. To this mixture was added a solution of 3.6 grams of water in 2 ml. of isopropanol. All of the above mixture was added to 170 grams of zircon powder and the resulting slurry used to cast a crucible. The slurry set in about 15 minutes. After air-drying, the crucible was fired at 1000° C. to mature the zirconia bond.

EXAMPLE 19

80 grams of the product of Example 1 and 20 grams of diethanolamine were mixed. 25 grams of this mixture were mixed with a gelling agent comprising a mixture of 5 ml. of isopropanol and 5 ml. of a 20% (w./w.) solution of water in isopropanol. Prior to gelation of the total liquid composition, 150 grams of alumina were added and the slurry used to cast a crucible. The crucible moulding, when set, was allowed to air-dry overnight and then fired to at least 1400° C. In this example the zirconium ester:diethanolamine molar ratio was 1:0.97.

In the above examples the figures for the molar proportion of hydroxyamine have been calculated taking the zirconium product used as consisting entirely of zirconium tetra beta-chloroethoxide.

What is claimed is:

1. Organic zirconium esters of the general formula $Zr(ORX)_4$ where R is an alkylene group having 2 to 4 carbon atoms and X is a halogen atom selected from the group consisting of chlorine, bromine and iodine atoms.

2. Zirconium tetra beta-chloroethoxide.

3. A process for preparing organic zirconium esters as claimed in claim 1 in which a zirconium tetrahalide selected from the group consisting of zirconium tetrachloride, tetrabromide and tetraiodide is reacted with an epoxy alkane containing 2 to 4 carbon atoms.

4. A liquid composition comprising an organic zirconium ester of the general formula $Zr(ORX)_4$ where R is an alkylene group having 2 to 4 carbon atoms and X is a halogen atom selected from the group consisting of chlorine, bromine and iodine atoms, and an aliphatic hydroxyamine having the general formula $R^1.NH.R^2$ where $R^1$ is a hydroxyalkyl group containing 2 to 4 carbon atoms and $R^2$ is a group selected from the class consisting of hydrogen, and alkyl and hydroxyalkyl groups containing up to 4 carbon atoms, the amount of the hydroxyamine being such that the composition is capable of forming a gel by hydrolysis.

5. A liquid composition as claimed in claim 4 in which the amount of the hydroxyamine is at least 1 mole per mole of the zirconium ester.

6. A liquid composition as claimed in claim 4 in which the aliphatic hydroxyamine is of the formula $R^1.NH.R^2$ where $R^1$ is a hydroxyalkyl group containing 2 to 4 carbon atoms and $R^2$ is a hydroxyalkyl group containing up to 4 carbon atoms, the amount of the hydroxyamine being at least 0.5 mole per mole of the zirconium ester.

7. A liquid composition as claimed in claim 5 wherein the hydroxyamine is one selected from the group consisting of monoethanolamine and monoisopropanolamine.

8. A liquid composition as claimed in claim 6 wherein the hydroxyamine is diethanolamine.

9. A liquid composition as claimed in claim 8 wherein the amount of the diethanolamine is at least about 1.3 moles per mole of the zirconium ester.

10. A liquid composition comprising an organic zirconium ester of the general formula $Zr(ORX)_4$ where R is an alkylene group having 2 to 4 carbon atoms and X is a halogen selected from the group consisting of chlorine, bromine and iodine atoms and at least 1 mole of 2-amino -2-ethyl-propan-1,3-diol per mole of the zirconium ester.

11. A method of producing a gel suitable for use as a binder for refractory powders comprising mixing a liquid composition as claimed in claim 4 with a solution of water in a mutual solvent for water, the ester and hydroxyamine, which solvent is a low aliphatic alcohol containing from 1 to 3 carbon atoms, so as to cause the formation of a gel.

12. A method of making refractory articles comprising mixing a liquid composition as claimed in claim 4 with a solution of water in a mutual solvent for water, the amine and ester, which solvent is a low aliphatic alcohol containing from 1 to 3 carbon atoms so as to cause the formation of a gel, adding to the liquid mixture prior to gel formation a refractory powder, forming the resultant mixture into the desired shape, allowing gel formation to occur and the shape to harden, and then firing the hardened shape.

13. A method of making refractory articles comprising mixing a liquid composition as claimed in claim 9 with water so as to cause the formation of a gel, adding to the liquid mixture prior to gel formation a refractory powder, forming the resultant mixture into the desired shape, allowing gel formation to occur and the shape to harden, and then firing the hardened shape.

14. A method of making refractory articles comprising mixing a liquid composition as claimed in claim 10 with a solution of water in a mutual solvent for water, the amine and ester, which solvent is a low aliphatic alcohol containing from 1 to 3 carbon atoms so as to cause the formation of a gel, adding to the liquid mixture prior to gel formation a refractory powder, forming the resultant mixture into the desired shape, allowing gel formation to occur and the shape to harden, and then firing the hardened shape.

15. A method of producing a gel suitable for use as a binder for refractory powders comprising mixing a liquid composition as claimed in claim 9 with water so as to cause the formation of a gel.

References Cited by the Examiner

UNITED STATES PATENTS

| | | | |
|---|---|---|---|
| 2,381,242 | 8/45 | Wood | 106—38.2 |
| 2,911,310 | 11/59 | Shaw | 106—38.2 |
| 2,924,614 | 2/60 | Reuter | 260—429.3 |
| 2,956,071 | 10/60 | Samour | 260—429.3 |
| 2,977,378 | 3/61 | Kasper | 260—429.3 |
| 2,978,347 | 4/61 | Koehler | 106—308 |
| 3,056,818 | 10/62 | Werber | 260—410.6 |

ALEXANDER H. BRODMERKEL, *Primary Examiner.*

MORRIS LIEBMAN, *Examiner.*